United States Patent
Tanabe et al.

(10) Patent No.: US 10,613,638 B2
(45) Date of Patent: Apr. 7, 2020

(54) ELECTRONIC DEVICE

(71) Applicant: KYOCERA Corporation, Kyoto (JP)

(72) Inventors: Shigeki Tanabe, Yokohama (JP); Hideki Morita, Yokohama (JP); Isao Masuike, Machida (JP); Shinya Saito, Kawasaki (JP); Yasushi Kitamura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/652,512

(22) Filed: Jul. 18, 2017

(65) Prior Publication Data

US 2018/0032140 A1 Feb. 1, 2018

(30) Foreign Application Priority Data

Jul. 27, 2016 (JP) .................................. 2016-147889

(51) Int. Cl.
| | | |
|---|---|---|
| *G06F 3/01* | (2006.01) | |
| *G06F 3/0346* | (2013.01) | |
| *G06F 3/038* | (2013.01) | |

(52) U.S. Cl.
CPC .............. *G06F 3/017* (2013.01); *G06F 3/038* (2013.01); *G06F 3/0346* (2013.01)

(58) Field of Classification Search
None
See application file for complete search history.

(56) References Cited

U.S. PATENT DOCUMENTS

| | | | |
|---|---|---|---|
| 8,031,164 B2 | 10/2011 | Herz et al. | |
| 8,866,735 B2* | 10/2014 | Zhao ..................... | G06F 1/1626 |
| | | | 345/156 |
| 8,949,639 B2* | 2/2015 | Kamhi .................. | G06F 1/3287 |
| | | | 713/320 |
| 9,449,492 B2 | 9/2016 | Dixon et al. | |
| 9,679,465 B2 | 6/2017 | Matsuoka et al. | |
| 9,691,257 B2 | 6/2017 | Matsuoka et al. | |
| 9,753,519 B2* | 9/2017 | Cheng .................. | G06F 1/3231 |
| 2008/0165115 A1 | 7/2008 | Herz et al. | |
| 2009/0194341 A1* | 8/2009 | Nousiainen ........... | G06F 1/3203 |
| | | | 178/18.01 |
| 2010/0079508 A1* | 4/2010 | Hodge .................... | G06F 3/013 |
| | | | 345/697 |

(Continued)

FOREIGN PATENT DOCUMENTS

| | | | |
|---|---|---|---|
| JP | 2005-051472 A | 2/2005 | |
| JP | 2005-260823 A | 9/2005 | |

(Continued)

OTHER PUBLICATIONS

An Office Action; "Notice of Reasons for Rejection" issued by the Japanese Patent Office dated Dec. 12, 2017, which corresponds to Japanese Patent Application No. 2016-147889 and is related to U.S. Appl. No. 15/652,512; with English language Concise Explanation.

(Continued)

*Primary Examiner* — Patrick F Marinelli
(74) *Attorney, Agent, or Firm* — Studebaker & Brackett PC

(57) ABSTRACT

An electronic device includes a controller that executes processing in response to a gesture. The controller starts the processing in response to a gesture in accordance with the physical state of the electronic device.

6 Claims, 6 Drawing Sheets

(56) References Cited

U.S. PATENT DOCUMENTS

| | | | |
|---|---|---|---|
| 2010/0300771 A1 | 12/2010 | Miyazaki | |
| 2011/0175626 A1* | 7/2011 | Lee | G06F 1/3203 |
| | | | 324/629 |
| 2011/0249165 A1* | 10/2011 | Churei | G03B 13/02 |
| | | | 348/333.02 |
| 2012/0001960 A1 | 1/2012 | Herz et al. | |
| 2012/0032894 A1* | 2/2012 | Parivar | G06F 1/3215 |
| | | | 345/173 |
| 2012/0092254 A1* | 4/2012 | Wong | G01V 8/20 |
| | | | 345/158 |
| 2012/0154292 A1* | 6/2012 | Zhao | G06F 1/1626 |
| | | | 345/173 |
| 2012/0212447 A1* | 8/2012 | Huang | G06F 3/044 |
| | | | 345/174 |
| 2013/0033418 A1 | 2/2013 | Bevilacqua et al. | |
| 2013/0135198 A1* | 5/2013 | Hodge | G06F 3/013 |
| | | | 345/156 |
| 2013/0191910 A1* | 7/2013 | Dellinger | G06F 3/0488 |
| | | | 726/19 |
| 2014/0006830 A1* | 1/2014 | Kamhi | G06F 1/3287 |
| | | | 713/324 |
| 2014/0106822 A1* | 4/2014 | Smith | G06F 1/1626 |
| | | | 455/566 |
| 2014/0198024 A1 | 7/2014 | Adzhigirey et al. | |
| 2014/0215248 A1* | 7/2014 | Cheng | G06F 1/3231 |
| | | | 713/323 |
| 2014/0317499 A1 | 10/2014 | Oh et al. | |
| 2014/0337732 A1 | 11/2014 | Bevilacqua et al. | |
| 2015/0022316 A1 | 1/2015 | Dixon et al. | |
| 2015/0022344 A1 | 1/2015 | Matsuoka et al. | |
| 2015/0029019 A1 | 1/2015 | Matsuoka et al. | |
| 2015/0153803 A1* | 6/2015 | Tokutake | G06F 3/0488 |
| | | | 713/323 |
| 2015/0346831 A1 | 12/2015 | Nii | |
| 2017/0052597 A1 | 2/2017 | Dixon et al. | |
| 2017/0273029 A1* | 9/2017 | Juang | H04W 52/146 |
| 2017/0353808 A1* | 12/2017 | Oishi | G06F 3/165 |
| 2018/0032140 A1* | 2/2018 | Tanabe | G06F 3/017 |
| 2018/0034950 A1* | 2/2018 | Tanabe | G06F 3/0304 |
| 2018/0210433 A1* | 7/2018 | Griffiths | G05B 19/42 |
| 2018/0285587 A1* | 10/2018 | Dellinger | G06F 21/6218 |
| 2019/0005895 A1* | 1/2019 | Hsu | G09G 3/3648 |
| 2019/0075415 A1* | 3/2019 | Oishi | G06F 3/165 |

FOREIGN PATENT DOCUMENTS

| | | |
|---|---|---|
| JP | 2007-150996 A | 6/2007 |
| JP | 2010-034685 A | 2/2010 |
| JP | 2010-516022 A | 5/2010 |
| JP | 2010277198 A | 12/2010 |
| JP | 2013-074546 A | 4/2013 |
| JP | 2014135668 A | 7/2014 |
| JP | 2014-527666 A | 10/2014 |
| JP | 2015-199383 A | 11/2015 |
| JP | 2015225493 A | 12/2015 |
| JP | 3205420 U | 7/2016 |
| WO | 2015/002300 A1 | 1/2015 |
| WO | 2016098519 A1 | 6/2016 |

OTHER PUBLICATIONS

An Office Action; "Notice of Reasons for Rejection" issued by the Japanese Patent Office dated Dec. 12, 2017, which corresponds to Japanese Patent Application No. 2017-211787 and is related to U.S. Appl. No. 15/652,512; with English language Concise Explanation.
An Office Action; "Notice of Reasons for Rejection" issued by the Japanese Patent Office dated Mar. 6, 2018, which corresponds to Japanese Patent Application No. 2016-147889 and is related to U.S. Appl. No. 15/652,512; with English language Concise Explanation.
An Office Action; "Notice of Reasons for Rejection," mailed by the Japanese Patent Office dated Jul. 25, 2017, which corresponds to Japanese Patent Application No. 2017-075483 and is related to U.S. Appl. No. 15/652,512; with English language Concise Explanation.
An Office Action; "Notice of Reasons for Rejection," mailed by the Japanese Patent Office dated Sep. 12, 2017, which corresponds to Japanese Patent Application No. 2016-147889 and is related to U.S. Appl. No. 15/652,512; with English language Concise Explanation.
An Office Action; "Notice of Reasons for Rejection," mailed by the Japanese Patent Office dated Oct. 4, 2016, which corresponds to Japanese Patent Application No. 2016-147889; with English language Concise Explanation.
An Office Action; "Notice of Reasons for Rejection," mailed by the Japanese Patent Office dated May 12, 2017, which corresponds to Japanese Patent Application No. 2017-75483; with English language Concise Explanation.

* cited by examiner

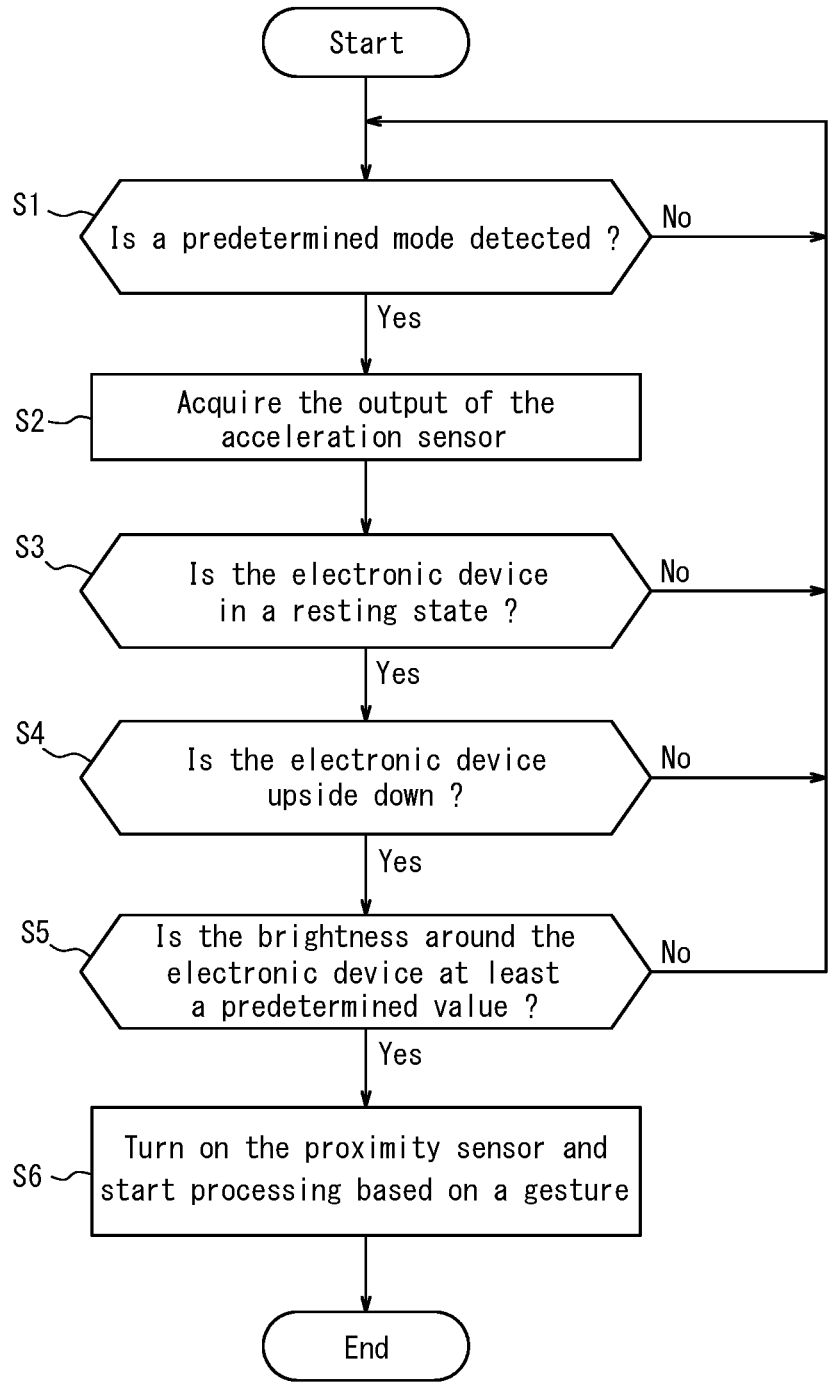

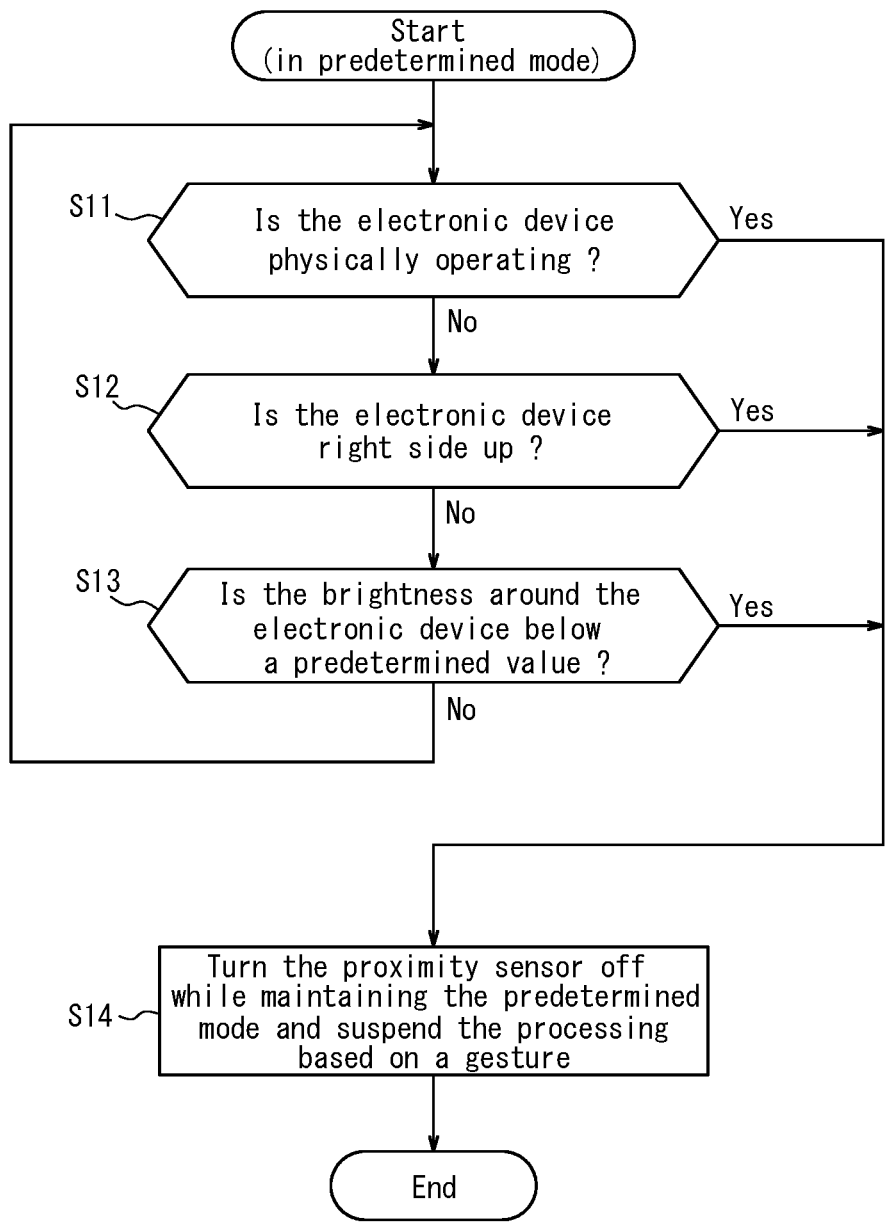

ELECTRONIC DEVICE

CROSS-REFERENCE TO RELATED APPLICATION

This application claims priority to and the benefit of Japanese Patent Application No. 2016-147889 filed Jul. 27, 2016, the entire contents of which are incorporated herein by reference.

TECHNICAL FIELD

This disclosure relates to an electronic device.

BACKGROUND

A mobile terminal that uses an infrared sensor is known. Such a mobile terminal recognizes a gesture performed by the user at a distance from the terminal. The terminal then processes an input operation corresponding to the gesture.

SUMMARY

If a gesture not intended by the user is recognized, the terminal might malfunction. The same issue exists when using a different type of proximity sensor instead of the infrared sensor.

Therefore, it would be helpful to provide an electronic device that can prevent malfunctioning of the proximity sensor.

An electronic device according to one aspect includes:
a controller configured to execute processing in response to a gesture; such that
the controller starts the processing in response to the gesture in accordance with a physical state of the electronic device.

An electronic device according to another aspect includes:
a proximity sensor; and
a controller; such that
the controller starts processing in response to a gesture in accordance with a physical state of the electronic device, the gesture being detected by the proximity sensor.

An electronic device according to another aspect includes:
a controller configured to execute processing in response to a gesture; such that
the controller starts the processing in response to the gesture upon the electronic device entering a predetermined mode; and
when an event occurs while the electronic device is in the predetermined mode, the controller suspends the processing in response to the gesture while maintaining the predetermined mode.

An electronic device according to another aspect includes:
a proximity sensor; and
a controller; such that
when an event occurs while the electronic device is in a predetermined mode, the proximity sensor being on in the predetermined mode, the controller turns the proximity sensor off while maintaining the predetermined mode.

An electronic device according to another aspect includes:
a proximity sensor; and
a controller; such that
when an event occurs while the electronic device is in a predetermined mode, the proximity sensor being in a first operating state in the predetermined mode, the controller switches the proximity sensor to a second operating state that differs from the first operating state while maintaining the predetermined mode.

The electronic device according to one of the disclosed embodiments can prevent malfunctioning of the proximity sensor.

BRIEF DESCRIPTION OF THE DRAWINGS

In the accompanying drawings:

FIG. 5 is a flowchart illustrating an example of processing executed by an electronic device according to one embodiment; and FIG. 6 is a flowchart illustrating another example of processing executed by an electronic device according to one embodiment.

DETAILED DESCRIPTION

Figure 1:
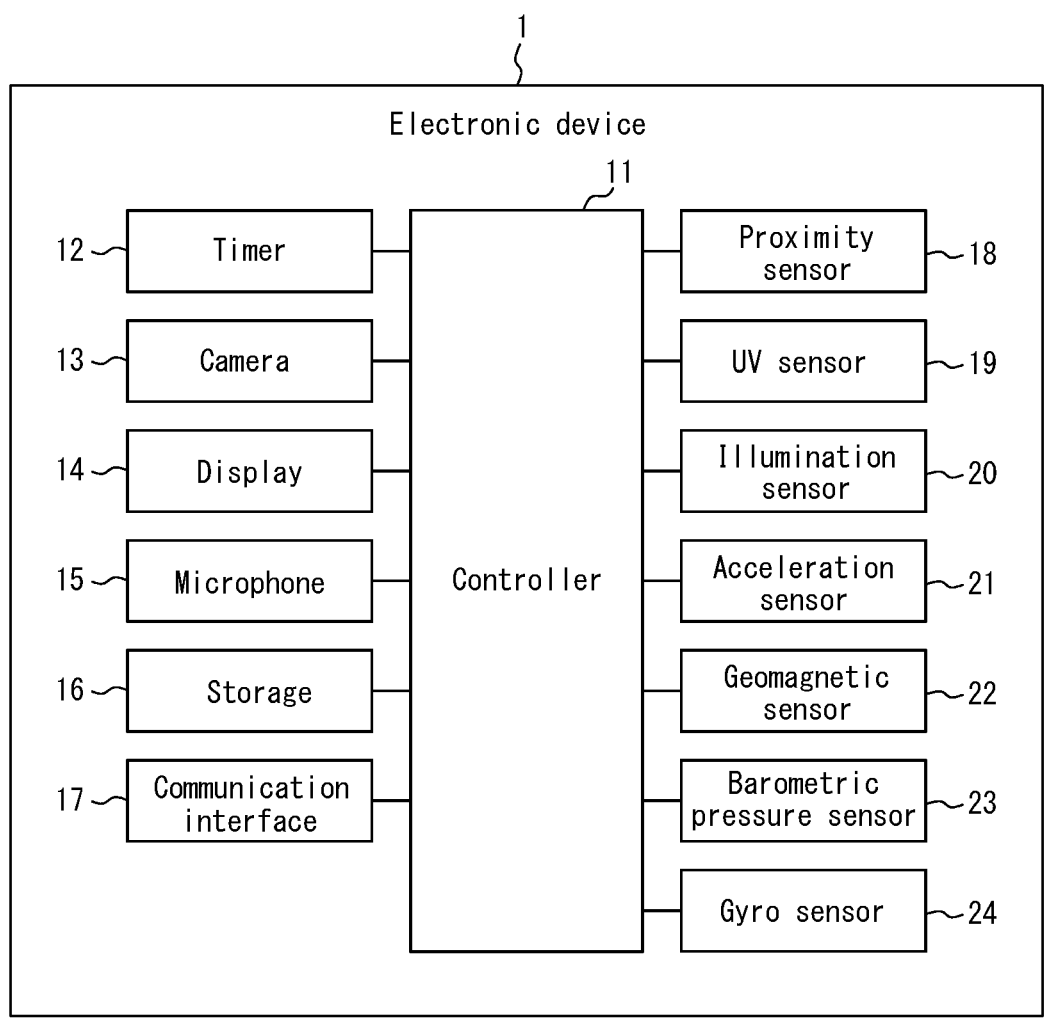
FIG. 1 is a schematic configuration diagram of an electronic device according to one embodiment.

The electronic device 1 according to one embodiment illustrated in FIG. 1 includes a controller 11, a timer 12, a camera 13, a display 14, a microphone 15, a storage 16, a communication interface 17, a proximity sensor (gesture sensor) 18, and an ultraviolet (UV) sensor 19. The electronic device 1 further includes an illumination sensor 20, an acceleration sensor 21, a geomagnetic sensor 22, a barometric pressure sensor 23, and a gyro sensor 24. Since FIG. 1 is only an example, the electronic device 1 need not include all of the components illustrated in FIG. 1. Also, the electronic device 1 may include components other than those illustrated in FIG. 1.

The controller 11 is a processor such as a Central Processing Unit (CPU). The controller 11 may be a System-on-a-Chip (SoC) or other type of integrated circuit in which other components are integrated. The controller 11 may be configured by combining a plurality of integrated circuits. The controller 11 implements a variety of functions by comprehensively controlling operations of the electronic device 1.

In greater detail, the controller 11 refers as necessary to data stored in the storage 16. The controller 11 implements a variety of functions by executing instructions included in programs stored in the storage 16 to control other functional components such as the display 14 and microphone 15.

As described below, the controller 11 executes processing in response to a gesture in accordance with the physical state of the electronic device 1 and suspends processing in response to a gesture upon the occurrence of an event.

The timer 12 receives an instruction for a timer operation from the controller 11. Once a predetermined time has elapsed, the timer 12 outputs a signal indicating so to the controller 11. The timer 12 may be provided external to the controller 11, as illustrated in FIG. 1, or may be included within the controller 11.

The camera 13 captures images of subjects around the electronic device 1. As an example, the camera 13 in one embodiment is a front camera provided on the face of the electronic device 1 where the display 14 is provided.

The display 14 is provided with a display device such as a liquid crystal display, an organic electro-luminescence panel, or an inorganic electro-luminescence panel. The display 14 displays information such as letters, images, symbols, or graphics. The display 14 may include a touchscreen and detect contact on the touchscreen by a finger, stylus pen, or other object. In this case, the display 14 can detect the position on the touchscreen contacted by a plurality of fingers, stylus pens, or other objects.

The microphone 15 detects sounds around the electronic device 1, including people's voices.

The storage 16 functions as a memory storing programs and data. The storage 16 temporarily stores the processing result of the controller 11. The storage 16 may include any storage device, such as a semiconductor storage device or a magnetic storage device. The storage 16 may also include a plurality of types of storage devices. The storage 16 may include a combination of a portable storage medium, such as a memory card, and an apparatus for reading the storage medium.

The programs stored in the storage 16 include applications that run in the foreground or the background and a control program that supports operations of the applications. The applications for example cause the controller 11 to execute processing corresponding to a gesture. The control program may, for example, be an Operating System (OS). The applications and the control program may be installed on the storage 16 through wireless communication by the communication interface 17 or from a storage medium.

The communication interface 17 is for communicating over a wired or wireless connection. The communication method of the communication interface 17 in one embodiment is prescribed by a wireless communication standard. For example, a cellular phone communication standard such as 2G, 3G, or 4G may be used as the wireless communication standard. Examples of cellular phone communication standards include Long Term Evolution (LTE), Wideband Code Division Multiple Access (W-CDMA), CDMA2000, Personal Digital Cellular (PDC), Global System for Mobile communications (GSM® (GSM is a registered trademark in Japan, other countries, or both)), and Personal Handy-phone System (PHS). Examples of wireless communication standards include Worldwide Interoperability for Microwave Access (WiMAX), IEEE802.11, Bluetooth® (Bluetooth is a registered trademark in Japan, other countries, or both), Infrared Data Association (IrDA), and Near Field Communication (NFC). The communication interface 17 may support one or more of the aforementioned communication standards.

Without contact, the proximity sensor 18 detects the relative distance from an object near the electronic device 1 and the movement direction (gesture) of the object. The proximity sensor 18 in one embodiment includes four visible light photodiodes that can detect white, red, green, and blue. The proximity sensor 18 can measure the relative distance from the object. The proximity sensor 18 also includes one infrared Light Emitting Diode (LED) that acts as a light source and four infrared photodiodes that detect the up, down, left, and right directions. An object is irradiated by infrared light from the infrared LED acting as a light source, and the proximity sensor 18 detects the movement direction of the object by the difference in time at which reflected light from the object is incident on each of the infrared photodiodes. Accordingly, the proximity sensor 18 can detect an air gesture (gesture) that the user of the electronic device 1 performs without touching the electronic device 1.

The UV sensor 19 can measure the amount of ultraviolet light included in sunlight or other light.

The illumination sensor 20 detects the degree of illumination of surrounding light that is incident on the illumination sensor 20.

The acceleration sensor 21 detects the acceleration acting on the electronic device 1.

The geomagnetic sensor 22 detects the orientation of the earth's magnetism. In one embodiment, the component when the orientation of the electronic device 1 is projected onto a plane parallel to the ground is the orientation information acquired by the geomagnetic sensor 22. The orientation information acquired by the geomagnetic sensor 22 is the direction of the electronic device 1.

The barometric pressure sensor 23 detects the barometric pressure outside of the electronic device 1 (atmospheric pressure).

The gyro sensor 24 detects the angular velocity of the electronic device 1. The controller 11 can measure the orientation of the electronic device 1 by time integrating the angular velocity, acquired by the gyro sensor 24, once.

Figure 2:
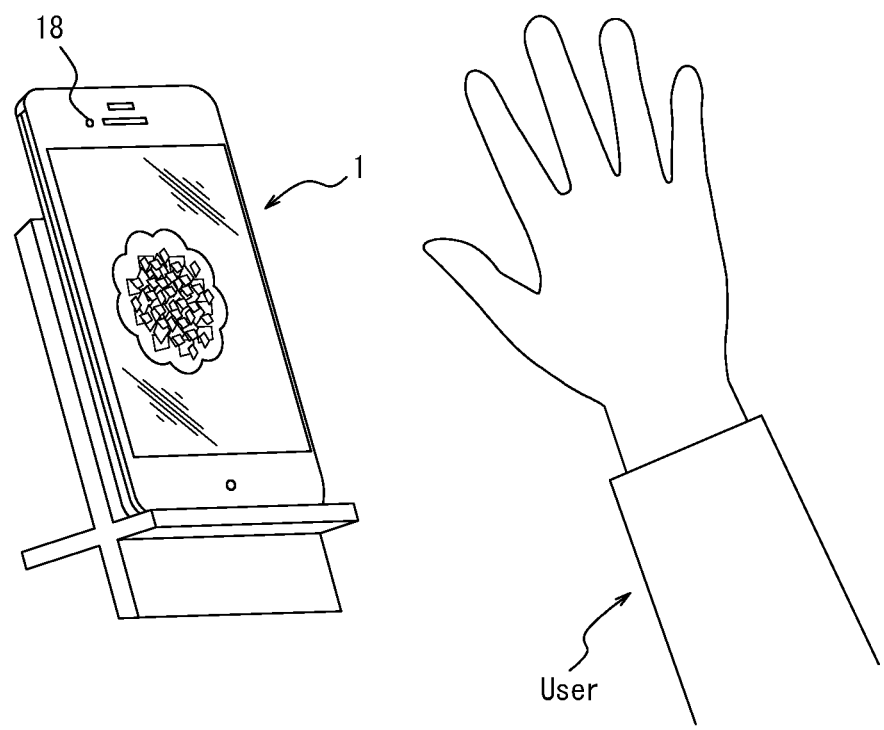
FIG. 2 illustrates the user operating an electronic device with a gesture.

FIG. 2 illustrates the user operating the electronic device 1 with a gesture. In FIG. 2, the electronic device 1 is supported on a stand as an example. Alternatively, the electronic device 1 may be supported against a wall. Upon the proximity sensor 18 detecting a gesture by the user, the controller 11 executes processing in response to the gesture. Processing in response to the gesture may be processing such as scrolling the screen displayed on the display 14 or pinching the screen in or out.

The electronic device 1 in FIG. 2 is a smartphone. Alternatively, the electronic device 1 may, for example, be a mobile phone, a phablet, a tablet PC, a feature phone, or other such device. The electronic device 1 is not limited to these examples and may be any electronic device such as a Personal Digital Assistant (PDA), remote control, portable music player, game machine, household appliance, or industrial device (Factory Automation (FA) device). Furthermore, the electronic device 1 may be any device that includes the display 14, such as a desktop PC, a bank ATM, a ticket machine at a train station, a digital camera, or an e-book reader.

The electronic device 1 provided with the display 14 may also be adopted in an in-vehicle control panel mounted in the steering wheel, car navigation, or dashboard of an automobile, or may be adopted in any other type of transportation.

The processing executed by the controller 11 of the electronic device 1 in one embodiment is described below in detail.

[Processing to Turn on the Proximity Sensor 18]

While the proximity sensor 18 is turned off, the controller 11 automatically turns the proximity sensor 18 on in accordance with a physical state of the electronic device 1 and starts processing in response to a gesture, as follows. As an example in one embodiment, the controller 11 turns the proximity sensor 18 on when determining that all of the first event, second event (or third event), and fourth event below have occurred.

The controller 11 determines whether the electronic device 1 has entered a predetermined mode in response to user operation. The predetermined mode in one embodiment is, for example, a kitchen mode in which an application that displays a cooking recipe on the display 14 has been launched. The predetermined mode is not limited to this example, however, and may be any mode on the electronic device 1.

[First Event Related to Physical State]

Having detected the predetermined mode, the controller 11 acquires output from the acceleration sensor 21 at regular or irregular intervals. By referring to the acquired output, the controller 11 determines whether the physical state of the electronic device 1 is a resting state. The resting state is, for example, a state of being at rest on a table, a knee, a bed, or other surface. For example, the controller 11 may determine that the electronic device 1 is in a resting state when at least one of the following conditions is satisfied.

Condition 1: The change in the acquired output is at most a predetermined value

Condition 2: The acquired output is at most a predetermined value

Condition 3: The pattern of change in the acquired output matches a predetermined pattern The controller 11 may determine that the electronic device 1 is in the resting state when detecting, with the timer 12, that at least one of Conditions 1 to 3 has continued for a predetermined time.

[Second Event Related to Physical State]

Figure 3:
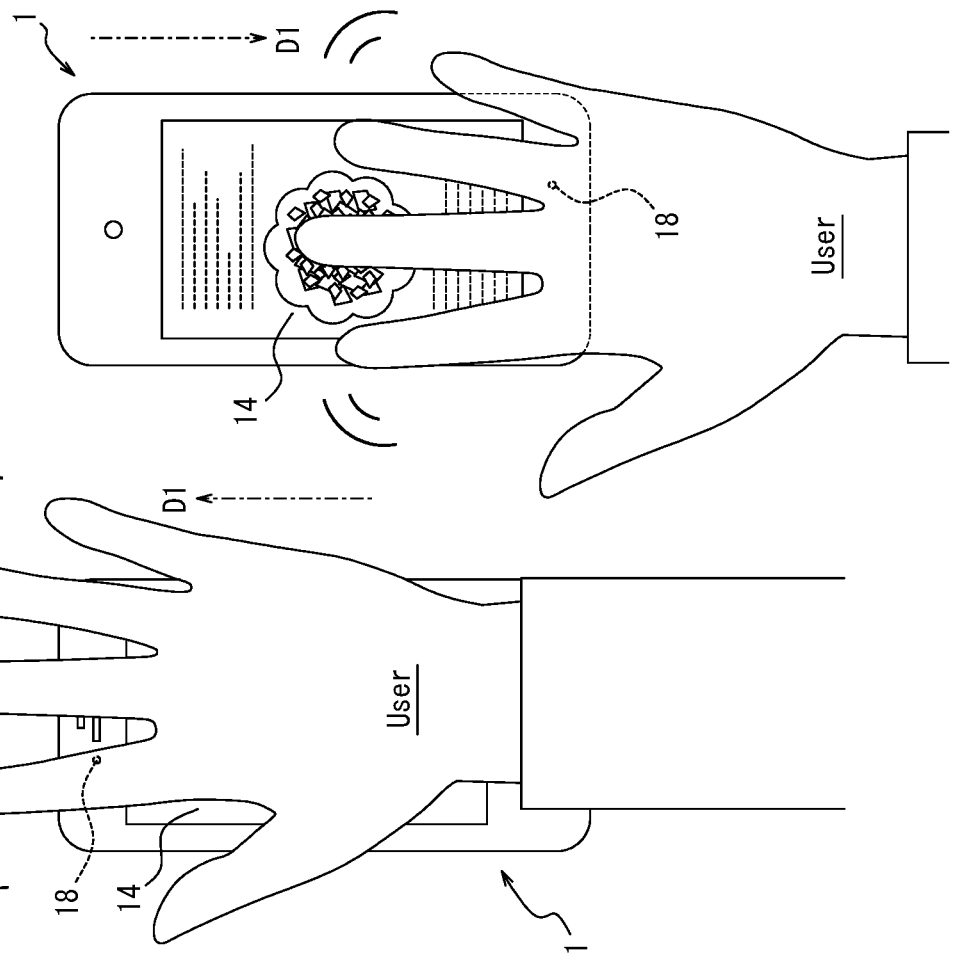
FIG. 3A is a front view of an electronic device.
FIGS. 3B and 3C illustrate examples of the positional relationship between the user and the electronic device.

A state in which the user faces the electronic device 1, as illustrated in FIG. 2, is described in detail with reference to FIGS. 3A to 3C. The reference direction D1 illustrated in FIG. 3A is the direction, in one of the longitudinal directions of the electronic device 1, towards the receiver from the center of the display 14 of the electronic device 1. In FIG. 3A, the reference direction D1 is approximately the opposite direction from the direction of gravity. The proximity sensor 18 in one embodiment can also be used to determine whether to turn off the display 14 during a phone call. Therefore, the proximity sensor 18 is provided within a predetermined distance from the receiver at the top of the electronic device 1. In order to operate the electronic device 1 with a gesture given this arrangement, the user's hand needs to pass over an area approximately perpendicular to the electronic device 1 from the proximity sensor 18, as illustrated in FIG. 3B. The reason is that a certain viewing angle exists in terms of device characteristics or structural design. At this time, the display 14 is covered by the user's hand, making it difficult for the user to visually confirm the display 14. As illustrated in FIG. 3C, however, when the reference direction D1 of the electronic device 1 is in approximately the opposite direction from FIGS. 3A and 3B, the proximity sensor 18 is disposed closer to the user's body. Hence, the entire display 14 is not covered by the user's hand.

Therefore, as the physical state of the electronic device 1, the controller 11 makes a determination regarding the orientation of the electronic device 1. In greater detail, the controller 11 determines that the electronic device 1 is upside down when determining that the two following conditions are satisfied.

Condition 1: On the basis of the output of the acceleration sensor 21, the smaller of the angles between the reference direction D1 of the electronic device 1 and the direction of gravity is at most a predetermined value (for example, 50°)

Condition 2: The user is included in the subject of an image captured by the camera 13, which is a front camera As illustrated in FIG. 3C, the user can easily confirm the display 14 visually. Alternatively, the controller 11 may determine that the electronic device 1 is upside down when Condition 1 is satisfied.

[Third Event Related to Physical State]

Figure 4:
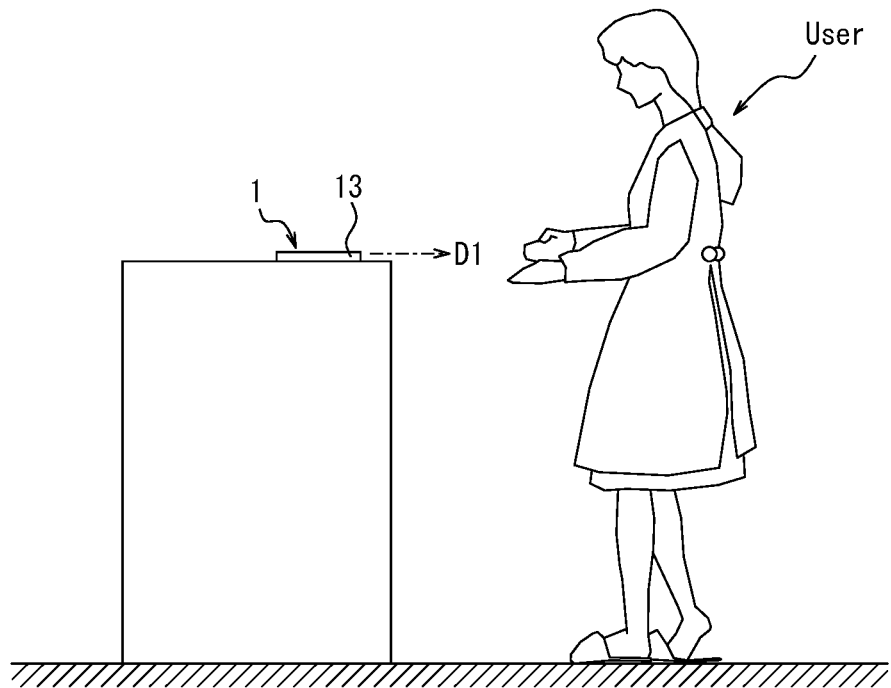
FIG. 4 illustrates another example of the positional relationship between the user and the electronic device.

As an alternative example of determining whether the second event has occurred, the controller 11 may determine the physical state of the electronic device 1 by determining whether the relative positional relationship between the electronic device 1 and the user as illustrated in FIG. 4 has been established. The relative positional relationship illustrated in FIG. 4 is a positional relationship such that the user is located in the reference direction D1 of the electronic device 1. In greater detail, by referring to the output of the acceleration sensor 21, the controller 11 determines whether the angle between the reference direction D1 of the electronic device 1 and the direction of gravity is approximately 90°. The controller 11 also activates the camera 13 and captures an image of a subject that includes the user. The controller 11 determines whether the user in the captured image is upside down relative to the reference direction D1. The determination of whether the user is upside down may, for example, be made by detecting the user's nose and eyes in the captured image and determining whether the nose and eyes are in an upside-down positional relationship relative to the reference direction D1. When determining that the angle between the reference direction D1 and the direction of gravity is approximately 90° and that the user is approximately upside down in the captured image, the controller 11 determines that a positional relationship such that the user is in the reference direction D1 of the electronic device 1 has been established.

[Fourth Event Related to Physical State]

When determining that the electronic device 1 is upside down, or when determining that a positional relationship such that the user is in the reference direction D1 of the electronic device 1 is established, the controller 11 makes a determination regarding the environment of the electronic device 1 as the physical state of the electronic device 1. In greater detail, by referring to output of the illumination sensor 20, the controller 11 determines whether the brightness around the electronic device 1 (for example, in the room) is at least a predetermined value. When determining that the brightness is at least a predetermined value, the controller 11 turns the proximity sensor 18 on. Alternatively, the controller 11 may turn the proximity sensor 18 on when determining that the brightness around the electronic device 1 is at least a predetermined value by referring to the output of the UV sensor 19 or an image captured by the camera 13.

As described above, the controller 11 of one embodiment starts processing in response to a gesture in accordance with the physical state of the electronic device 1. As a result, the starting point of processing in response to a gesture can be controlled, making it possible to prevent the proximity sensor 18 from malfunctioning at an unintended point in time. Also, power consumption can be reduced. According to one embodiment, for example when the user's hands are dirty while cooking in the kitchen, when the electronic device 1 is wet, or when the user does not want to touch the electronic device 1 in the bathtub, the electronic device 1 can receive an operation that places the hand over the electronic device 1 and can turn on the display 14. Accordingly, the user can perform a desired operation without touching the electronic device 1. The electronic device 1 of one embodiment is also useful when a hard key is provided on the side rather than the front of the electronic device 1 and the display 14 cannot be turned on without pressing the key on the side.

[Processing to Turn Off the Proximity Sensor 18]

As an example in one embodiment, when one of the events exemplified below occurs during a predetermined mode in which the proximity sensor 18 is on, the controller 11 turns the proximity sensor 18 off while maintaining the predetermined mode.

[Fifth Event]

The controller 11 determines whether the electronic device 1 is physically in operation (not in a resting state). In greater detail, the controller 11 may acquire output from the acceleration sensor 21 and determine that the electronic device 1 is physically in operation when at least one of the following conditions is satisfied.

Condition 1: The change in the acquired output exceeds a predetermined value

Condition 2: The acquired output exceeds a predetermined value

Condition 3: The pattern of change in the acquired output matches a predetermined pattern The controller 11 may determine that the electronic device 1 is physically in operation when detecting, with the timer 12, that at least one of Conditions 1 to 3 has continued for a predetermined time. When determining that the electronic device 1 is physically in operation, the controller 11 maintains the predetermined mode, turns the proximity sensor 18 off, and suspends processing in response to a gesture.

[Sixth Event]

The controller 11 determines whether the electronic device 1 is right side up (that is, with an appropriate side up) during a predetermined mode in which the proximity sensor 18 is on. In greater detail, the controller 11 determines that the electronic device 1 is right side up when determining that the two following conditions are satisfied.

Condition 1: The smaller of the angles between the reference direction D1 of the electronic device 1 and the direction of gravity is at least a predetermined value (for example, 130°)

Condition 2: The user is included in the subject of an image captured by the camera 13, which is a front camera Alternatively, the controller 11 may determine that the electronic device 1 is right side up when Condition 1 is satisfied. When determining that the electronic device 1 is right side up, the controller 11 maintains the predetermined mode, turns the proximity sensor 18 off, and suspends processing in response to a gesture.

[Seventh Event]

During a predetermined mode in which the proximity sensor 18 is on, the controller 11 determines whether the brightness around the electronic device 1 (for example, in the room) is below a predetermined value by referring to the output of the illumination sensor 20. When determining that the brightness is below a predetermined value, the controller 11 maintains the predetermined mode, turns the proximity sensor 18 off, and suspends processing in response to a gesture.

[Eighth Event]

Upon detecting that any object (such as the user's finger) has touched the display 14 or that a key on the electronic device 1 has been operated, the controller 11 turns the proximity sensor 18 off. The reason is that when a touch is detected or a key of the electronic device 1 is operated, operations by gesture are thought to be unnecessary.

As described above, the controller 11 of one embodiment begins processing in response to a gesture when the electronic device 1 enters a predetermined mode. Upon the occurrence of an event during the predetermined mode, the controller 11 suspends processing in response to a gesture while maintaining the predetermined mode. As a result, the proximity sensor 18 can be prevented from malfunctioning by receiving input of an unintended gesture. Since the proximity sensor 18 need not be on continuously, power consumption can also be reduced.

FIG. 5 is a flowchart illustrating an example of processing executed by the electronic device 1 according to one embodiment at any point in time while the proximity sensor 18 is off.

The electronic device 1 determines whether a predetermined mode is detected (step S1). When a predetermined mode is detected (step S1: Yes), the electronic device 1 acquires output of the acceleration sensor 21 at regular or irregular intervals (step S2).

Next, the electronic device 1 determines whether the electronic device 1 is in a resting state (step S3). Since the method for determining whether the electronic device 1 is in a resting state is described in the above embodiment, further description is omitted here. When determining that the electronic device 1 is in a resting state (step S3: Yes), the electronic device 1 determines whether the electronic device 1 is upside down (step S4). Since the method for determining whether the electronic device 1 is upside down is described in the above embodiment, further description is omitted here. When determining that the electronic device 1 is upside down (step S4: Yes), the electronic device 1 determines whether the brightness around the electronic device 1 is at least a predetermined value (step S5). Upon determining that the brightness around the electronic device 1 is at least a predetermined value (step S5: Yes), the electronic device 1 turns the proximity sensor 18 on and starts processing in response to a gesture (step S6). As a result, the electronic device 1 can execute processing in accordance with a gesture, such as scrolling a page displayed on the display 14.

FIG. 6 is a flowchart illustrating an example of processing executed by the electronic device 1 according to one embodiment at any point in time while the proximity sensor 18 is on and the electronic device 1 is in a predetermined mode.

The electronic device 1 determines whether the electronic device 1 is physically in operation (step S11). Since the method for determining whether the electronic device 1 is physically in operation is described in the above embodiment, further description is omitted here. When determining that the electronic device 1 is physically in operation (step S11: Yes), the electronic device 1 turns the proximity sensor 18 off while maintaining the predetermined mode and suspends processing in response to a gesture (step S14).

When determining that the electronic device 1 is not physically in operation (step S11: No), the electronic device 1 determines whether the electronic device 1 is right side up (step S12). Since the method for determining whether the electronic device 1 is right side up is as described in the above embodiment, further description is omitted here. When determining that the electronic device 1 is right side up (step S12: Yes), the electronic device 1 executes step S14.

When determining that the electronic device 1 is not right side up (step S12: No), the electronic device 1 determines whether the brightness around the electronic device 1 is below a predetermined value (step S13). When determining that the brightness is below a predetermined value (step S13: Yes), the electronic device 1 executes step S14. When determining that the brightness is not below a predetermined value (step S13: No), the electronic device 1 returns to step S11.

Other Embodiments

In the above embodiment, the controller 11 turns the proximity sensor 18 off upon the occurrence of an event. Alternatively, instead of turning the proximity sensor 18 off, the controller 11 may switch the proximity sensor 18 from being on in a first operating state to a second operating state that differs from the first operating state. Being on in the second operating state may, for example, refer to being on intermittently over predetermined cycles, as opposed to being on continuously in the first operating state. The second operating state may also refer to being on continuously or intermittently with lower power consumption than in the first operating state. As a result, the power consumption of the electronic device 1 can be reduced.

In the above embodiment, the controller 11 determines whether the electronic device 1 is in a resting state by referring to output from the acceleration sensor 21. Alternatively, the controller 11 may determine that the electronic device 1 is in a resting state when at least one of the following conditions is satisfied.
Condition 1: The electronic device 1 is not in a vehicle
Condition 2: The calling function of the electronic device 1 is suspended (off)
Condition 3: The degree of change between a plurality of images captured by the camera 13 at predetermined time intervals is at most a predetermined value The determination of whether the electronic device 1 is in a vehicle may, for example, be made by determining whether the user has set a driving mode or airplane mode, or may be made by referring to output from the acceleration sensor 21.

In the above embodiment, the controller 11 determines whether the electronic device 1 is physically in operation by referring to output from the acceleration sensor 21. Alternatively, the controller 11 may determine that the electronic device 1 is physically in operation when at least one of the following conditions is satisfied.
Condition 1: The degree of change between images captured by the camera 13 at predetermined time intervals is at least a predetermined value
Condition 2: The angular velocity acquired by the gyro sensor 24 is at least a predetermined value
Condition 3: The change in direction acquired by the geomagnetic sensor 22 is at least a predetermined value
Condition 4: The change in barometric pressure acquired by the barometric pressure sensor 23 is at least a predetermined value In the above embodiment, the controller 11 turns the proximity sensor 18 on when the brightness around the electronic device 1 is at least a predetermined value. In other words, when determining that the brightness around the electronic device 1 is below a predetermined value, the controller 11 turns the proximity sensor 18 off. As a result, the proximity sensor 18 is turned off at night, for example. Therefore, even if the user inadvertently places a hand over the electronic device 1 while sleeping at night, the proximity sensor 18 can be prevented from malfunctioning. Alternatively, the controller 11 may turn the proximity sensor 18 on when the brightness around the electronic device 1 is below a predetermined value. As a result, for example even when the surroundings of the electronic device 1 are dark, the user can turn on the display 14 of the electronic device 1 with a gesture and find out the location of the electronic device 1.

In the above embodiment, events for turning on the proximity sensor 18 that are related to a physical state have been described. Alternatively, for example by activating a voice recognition function when the electronic device 1 is in a sleep state, the controller 11 may perform voice recognition using voice data acquired from the microphone 15 and turn the proximity sensor 18 on when detecting one or more predetermined words. The predetermined word(s) may be a word, phrase, or sentence. The reason is that detection of one or more predetermined words by a voice recognition function is thought to indicate that the user is unable to operate the electronic device 1 directly. When detecting a touch on the display 14 or operation of a key on the electronic device 1 during operation of the voice recognition function, the controller 11 may turn off the proximity sensor 18 or leave the proximity sensor 18 off.

A standalone voice recognition function may always be turned on, but the word length or number of words that can be recognized by a voice recognition function and stored in the storage 16 is limited. Therefore, the controller 11 may always keep the voice recognition function turned on, regardless of whether the display 14 is on or off, and turn the proximity sensor 18 on upon detecting one or more predetermined words.

In the above embodiment, in order to determine whether the electronic device 1 is upside down, the controller 11 determines whether the smaller of the angles between the reference direction D1 of the electronic device 1 and the direction of gravity is at most a predetermined value (for example, 50°). Alternatively, the predetermined value of the angle may be 90° instead of 50°. As a result, the controller 11 can also turn the proximity sensor 18 on when the electronic device 1 is positioned horizontally.

In the above embodiment, the controller 11 turns the proximity sensor 18 on when determining that the first event, the second event (or third event), and the fourth event related to physical state have occurred. The events for turning on the proximity sensor 18, however, may include other events or include only a portion of the aforementioned events. The order in which events for turning on the proximity sensor 18 occur may also be altered in any way. The same holds for the events for turning off the proximity sensor 18.

In the above embodiment, the controller 11 turns off the proximity sensor 18 when determining that the brightness around the electronic device 1 is below a predetermined value by referring to the output of the illumination sensor 20. Alternatively, the controller 11 may turn the proximity sensor 18 off when determining that the brightness around the electronic device 1 is below a predetermined value by referring to the output of the UV sensor 19 or an image captured by the camera 13.

Instead of events related to physical state as in the above embodiment, the controller 11 may, for example, turn on the proximity sensor 18 when determining that at least one of the following conditions is satisfied.
The current time is included in a predetermined time slot
The position of an electronic device 1 acquired using a Global Positioning System (GPS) function is included within a predetermined range
A predetermined sound in the environment is detected by the microphone 15
The electronic device 1 is connected to a predetermined Wi-Fi network
The temperature acquired from a temperature sensor is within a predetermined range
The controller 11 may turn off the proximity sensor 18 when determining that these conditions are not satisfied while the proximity sensor 18 is on.

In the above embodiment, the controller 11 may implement sensor fusion by combining the output from a plurality of the sensors in FIG. 1. As a result, the controller 11 for example can more accurately calculate the state of the electronic device 1.

Much of the subject matter of the present disclosure is described as a series of operations executed by a computer system and other hardware that can execute program instructions. Examples of the computer system and other hardware include a general-purpose computer, a Personal Computer (PC), a dedicated computer, a workstation, a Personal Communications System (PCS), a mobile (cellular) phone, a mobile phone with a data processing function, an RFID receiver, a game machine, an electronic notepad, a laptop computer, a GPS receiver, and other programmable data processing apparatuses. It should be noted that in each embodiment, various operations are executed by a dedicated circuit (for example, individual logical gates interconnected in order to execute a particular function) implemented by program instructions (software), or by a logical block, program module, or the like executed by one or more processors. The one or more processors that execute a logical block, program module, or the like include, for example, one or more of a microprocessor, CPU, Application Specific Integrated Circuit (ASIC), Digital Signal Processor (DSP), Programmable Logic Device (PLD), Field Programmable Gate Array (FPGA), processor, controller, microcontroller, microprocessor, electronic device, other apparatus designed to be capable of executing the functions disclosed here, and/or a combination of any of the above. The embodiments disclosed here are, for example, implemented by hardware, software, firmware, middleware, microcode, or a combination of any of these. The instructions may be program code or a code segment for executing the necessary tasks. The instructions may be stored on a machine-readable, non-transitory storage medium or other medium. The code segment may indicate a combination of any of the following: procedures, functions, subprograms, programs, routines, subroutines, modules, software packages, classes, instructions, data structures, or program statements. The code segment may transmit and/or receive information, data arguments, variables, or memory content to or from another code segment or hardware circuit in order for the code segment to connect to another code segment or hardware circuit.

The storage used here may also be configured by a computer-readable, tangible carrier (medium) in the categories of solid-state memory, magnetic disks, and optical discs. Data structures and an appropriate set of computer instructions, such as program modules, for causing a processor to execute the techniques disclosed herein are stored on these media. Examples of computer-readable media include an electrical connection with one or more wires, a magnetic disk storage medium, a magnetic cassette, a magnetic tape, or other magnetic or optical storage medium, such as a Compact Disc (CD), Laser Disc®, Digital Versatile Disc (DVD®), Floppy® disk, and Blu-ray Disc® (laser disc, DVD, floppy, and Blu-ray Disc are registered trademarks in Japan, other countries, or both). Further examples include a portable computer disk, Random Access Memory (RAM), Read-Only Memory (ROM), rewritable programmable ROM such as Erasable Programmable Read-Only Memory (EPROM), Electrically Erasable Programmable Read-Only Memory (EEPROM), or flash memory, another tangible storage medium that can store information, or a combination of any of these. The memory may be provided internal and/or external to a processor or processing unit. As used in this disclosure, the term "memory" refers to all types of long-term storage, short-term storage, volatile, non-volatile, or other memory. No limitation is placed on the particular type or number of memories, or on the type of medium for memory storage.

The invention claimed is:

1. An electronic device, comprising:
   a proximity sensor;
   a display; and
   a controller, wherein
   the electronic device is configured to operate in a gesture-processing mode, the gesture-processing mode being a mode in which the controller executes processing in response to a gesture detected by the proximity sensor, and wherein
   the controller is configured to, when the electronic device is operating in the gesture-processing mode and the proximity sensor is on:
      determine whether the electronic device is right side up;
      in a case that the electronic device is not right side up, continue the processing in response to a gesture detected by the proximity sensor; and
      in a case that the electronic device is right side up, suspend the processing in response to a gesture detected by the proximity sensor, while maintaining the gesture-processing mode, wherein
   the controller is configured to determine that the electronic device is right side up when a smaller of two angles formed between a reference direction of the electronic device and a direction of gravity is at least a predetermined value, and wherein
   the reference direction of the electronic device is a direction, in a longitudinal direction of the electronic device, towards the proximity sensor from a center of the display.

2. The electronic device according to claim 1, wherein
   the controller is further configured to suspend the processing in response to a gesture detected by the proximity sensor, while maintaining the gesture-processing mode, in response to determining that the electronic device is in motion.

3. The electronic device according to claim 1, wherein
   in the case that the electronic device is right side up, the controller switches the proximity sensor from a first operating state in which the proximity sensor is on continuously to a second operating state in which the proximity sensor is on intermittently over predetermined cycles.

4. An electronic device, comprising:
   a proximity sensor;
   a display; and
   a controller, wherein
   the electronic device is configured to operate in a gesture-processing mode, the gesture-processing mode being a mode in which the controller executes processing in response to a gesture detected by the proximity sensor, and wherein
   the controller is configured to, when the electronic device is operating in the gesture-processing mode and the proximity sensor is in a first operating state:
      determine whether the electronic device is right side up;
      in a case that the electronic device is not right side up, continue the processing in response to a gesture detected by the proximity sensor; and
      in a case that the electronic device is right side up, switch the proximity sensor to a second operating state that differs from the first operating state and suspend the processing in response to a gesture detected by the proximity sensor, while maintaining the gesture-processing mode, wherein
   the controller is configured to determine that the electronic device is right side up when a smaller of two angles formed between a reference direction of the electronic device and a direction of gravity is at least a predetermined value, and wherein
the reference direction of the electronic device is a direction, in a longitudinal direction of the electronic device, towards the proximity sensor from a center of the display.

5. The electronic device according to claim 4, wherein
the controller is further configured to switch the proximity sensor to the second operating state and suspend the processing in response to a gesture detected by the proximity sensor, while maintaining the gesture-processing mode, in response to determining that the electronic device is in motion.

6. The electronic device according to claim 4, wherein
the first operating state is a state in which the proximity sensor is on continuously and the second operating state is a state in which the proximity sensor is on intermittently over predetermined cycles.

* * * * *